United States Patent [19]

Chaplin

[11] Patent Number: 5,249,039
[45] Date of Patent: Sep. 28, 1993

[54] CHROMA KEY METHOD AND APPARATUS

[75] Inventor: Daniel J. Chaplin, Nevada City, Calif.

[73] Assignee: The Grass Valley Group, Inc., Nevada City, Calif.

[21] Appl. No.: 793,982

[22] Filed: Nov. 18, 1991

[51] Int. Cl.$^5$ ............................................. H04N 9/74
[52] U.S. Cl. ........................................................ 358/22
[58] Field of Search ................ 358/22 CK, 183, 22, 358/181, 182, 183

[56] References Cited

U.S. PATENT DOCUMENTS

| | | | |
|---|---|---|---|
| 4,007,487 | 2/1977 | Vlahos | 358/22 |
| 4,109,278 | 8/1978 | Mendrala et al. | 358/22 |
| 4,206,474 | 6/1980 | Herrmann et al. | 358/22 |
| 4,319,266 | 3/1982 | Bannister | 358/22 |
| 4,344,085 | 8/1982 | Vlahos | 358/22 |
| 4,365,308 | 12/1982 | Heitmann | 364/577 |
| 4,386,363 | 5/1983 | Morrison | 358/122 |
| 4,394,680 | 7/1983 | Watanabe | 358/22 |
| 4,408,221 | 10/1983 | McCoy | 358/22 |
| 4,409,611 | 10/1983 | Vlahos | 358/22 |
| 4,413,273 | 11/1983 | Wischermann | 358/22 |
| 4,488,169 | 12/1984 | Yamamoto | 358/22 |
| 4,496,966 | 1/1985 | Hausdorfer et al. | 358/22 |
| 4,506,289 | 3/1985 | Shirakami | 358/22 |
| 4,533,937 | 8/1985 | Yamamoto et al. | 358/22 |
| 4,533,952 | 8/1985 | Norman, III | 358/22 |
| 4,580,158 | 4/1986 | Macheboeuf | 358/22 |
| 4,589,013 | 5/1986 | Vlahos et al. | 358/22 |
| 4,621,280 | 11/1986 | Shinohara et al. | 358/22 |
| 4,630,101 | 12/1986 | Inaba et al. | 358/22 |
| 4,636,838 | 1/1987 | Cosh | 358/22 |
| 4,667,221 | 5/1987 | Cawley et al. | 358/22 |
| 4,809,059 | 2/1989 | Flamm et al. | 358/27 |
| 4,811,084 | 3/1989 | Belmares-Sarabia et al. | 358/22 |
| 4,887,159 | 12/1989 | Chaplin | 358/181 |
| 4,908,700 | 3/1990 | Ishii et al. | 358/22 |

*Primary Examiner*—Victor R. Kostak
*Assistant Examiner*—John W. Miller
*Attorney, Agent, or Firm*—John Smith-Hill; Francis I. Gray

[57] ABSTRACT

A chroma key generation method and apparatus are provided (for both composite and component video) in which an operator selects a reference portion of a color television image to identify it as the background of the image, and a strobe signal is then generated whenever the video data that is presently passing through the keyer is within the reference portion of the color video image. This strobe causes the video data corresponding to that portion of the image to be stored. A microprocessor then determines attributes of the video in the reference portion of the color image from the stored video data, these attributes including a reference hue, $\alpha$. The image hue $\Theta$ at each pixel in the color image is correlated with the reference hue $\alpha$ to produce a correlation signal that has a first range of values for points of the color image at which the image hue matches the reference hue and a second range of values for points of the color image at which the image hue does not match the reference hue. After further processing, this correlation signal becomes a chroma key signal. The attributes of the video in the reference portion of the image are employed via the microprocessor to process the video signal and associated chroma key signal in several ways, including background suppression matte generation, shadow clip level input to the shadow comparison circuitry and the gain of the key signal variable gain comparator.

24 Claims, 12 Drawing Sheets

CHROMA KEY METHOD AND APPARATUS

BACKGROUND OF THE INVENTION

This invention relates to a method and apparatus for generating a chrominance keying signal and shaped fill video.

In a three-port video mixer two full field video signals may be combined on the basis of a key control signal that is associated with one of the video signals, typically referred to as the foreground signal, to provide a program signal. The key signal has a value of one for points of the output image that are to be occupied by the foreground image, a value of zero for points of the output image that are to be occupied by the background image and values between one and zero for points of the output image that are to be occupied by a mix between the foreground image and the background image.

A chroma key apparatus derives a key control signal from a video signal based on the hue of the image represented by that signal. One common application of a chroma key apparatus is in a news broadcast, in which the newscaster appears in the program image against a studio background. Generally, this program image is composed from a foreground image of the newscaster against a compositing screen that is of a selected hue, typically blue or green, and a background image of a studio. A key control signal is derived from the foreground video signal based on the hue of the foreground image: the key control signal has the value zero for points of the field that have the selected hue and has the value one elsewhere. When the foreground and background video signals are combined in a video mixer, the studio background appears in the program image at points for which the foreground image has the selected hue, and the foreground image appears elsewhere.

Figure 1:
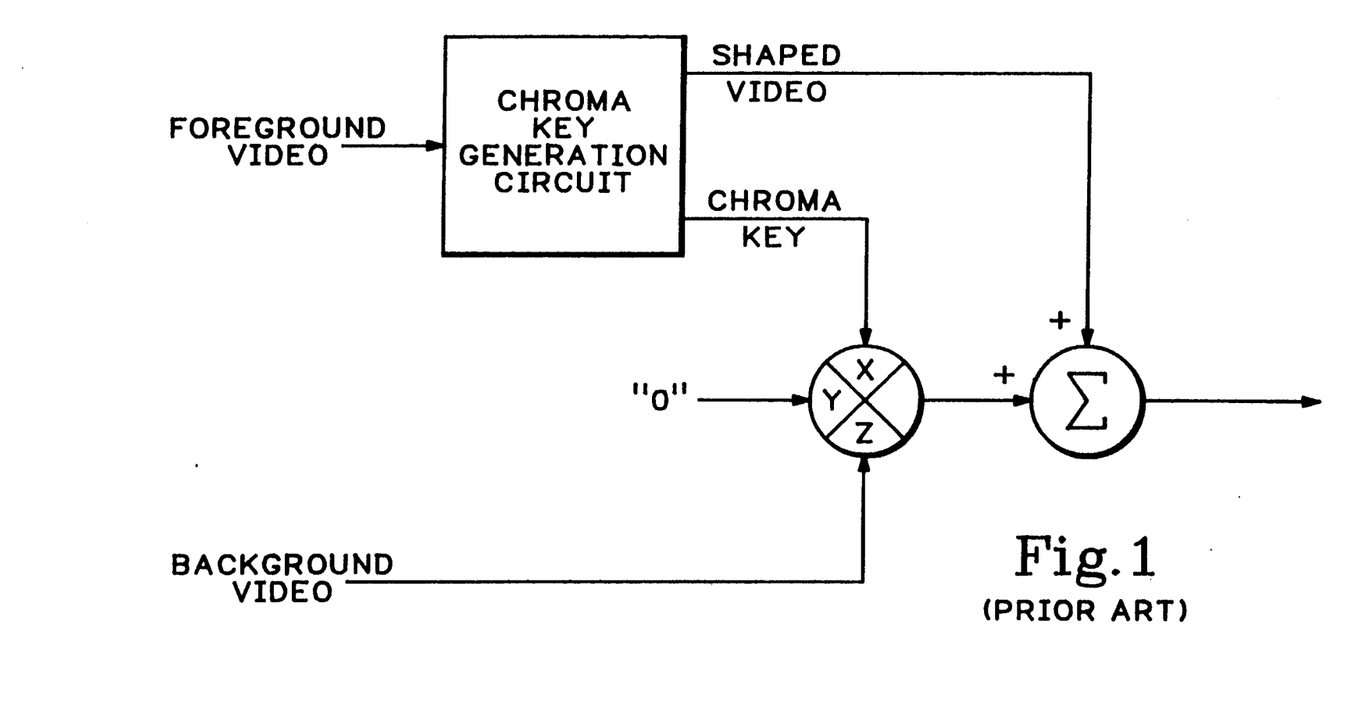
FIG. 1 is a simplified block diagram illustrating how a chroma key generation circuit operates with a mixer to combine foreground and background video signals.

FIG. 1 is a simplified block diagram illustrating how a chroma key generation circuit operates with a mixer and a summation circuit to combine foreground and background video signals. A chroma key generation circuit receives a foreground video signal and produces a chroma key signal and a shaped video output. The shaped video output is the foreground image "cut out" and appearing against a black background, while the chroma key signal is a control signal that operates to control the mixing of the background video with zero in a three-port mixer that operates in accordance with the standard mix equation:

$$\text{Output} = X \cdot Y + (1-X) \cdot Z \qquad (1)$$

The output of the three-port mixer is the background video signal with a hole "cut" into it where the shaped video will go. The summation circuit combines the shaped (foreground) video signal and the cut-out background video signal. The result is a full field video signal in which an object or person in the foreground signal appears against the, background.

Figure 2A:
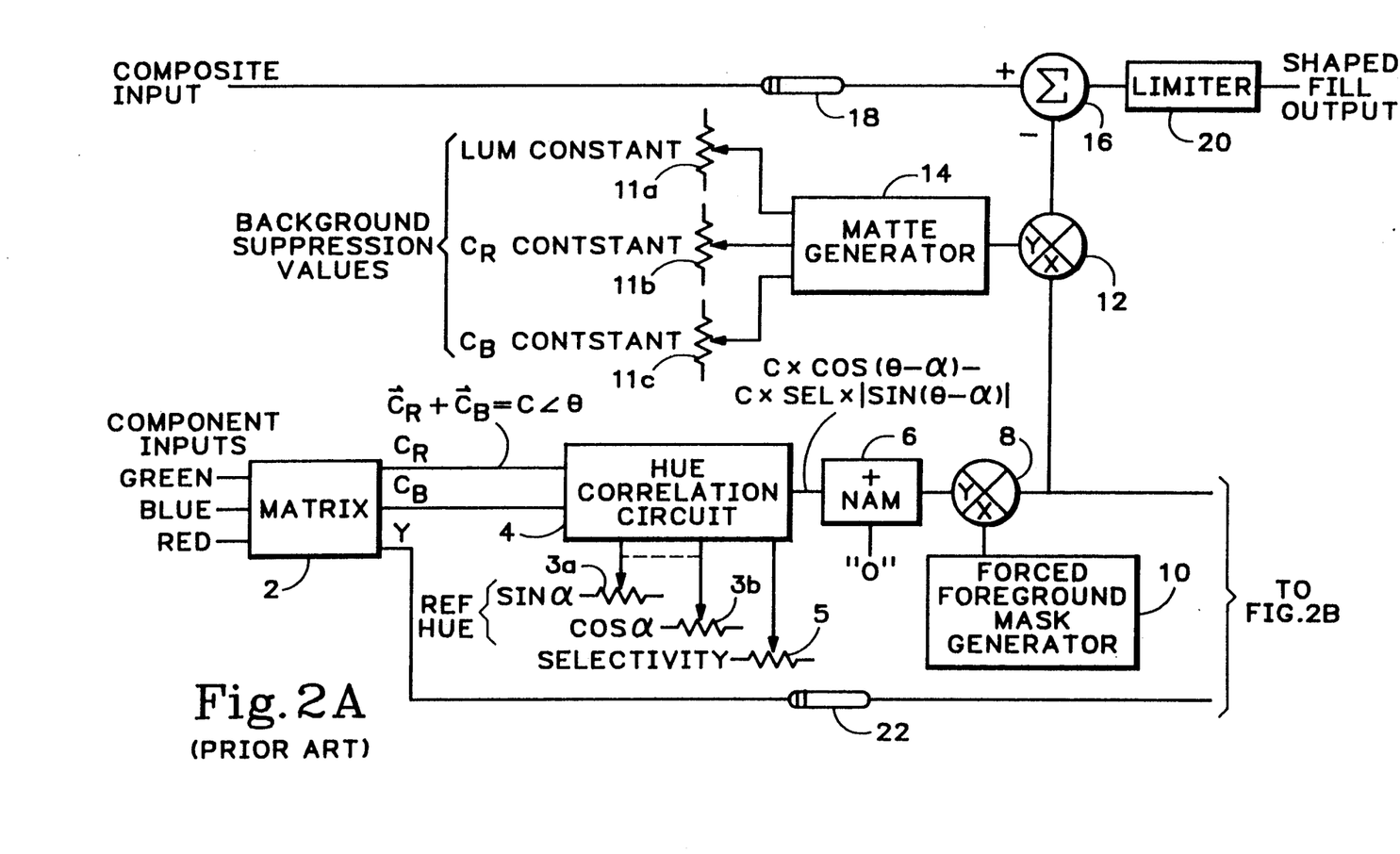
FIGS. 2A and 2B are a block diagram of a conventional chroma key generation circuit suitable for operating on composite video.
Figure 2B:
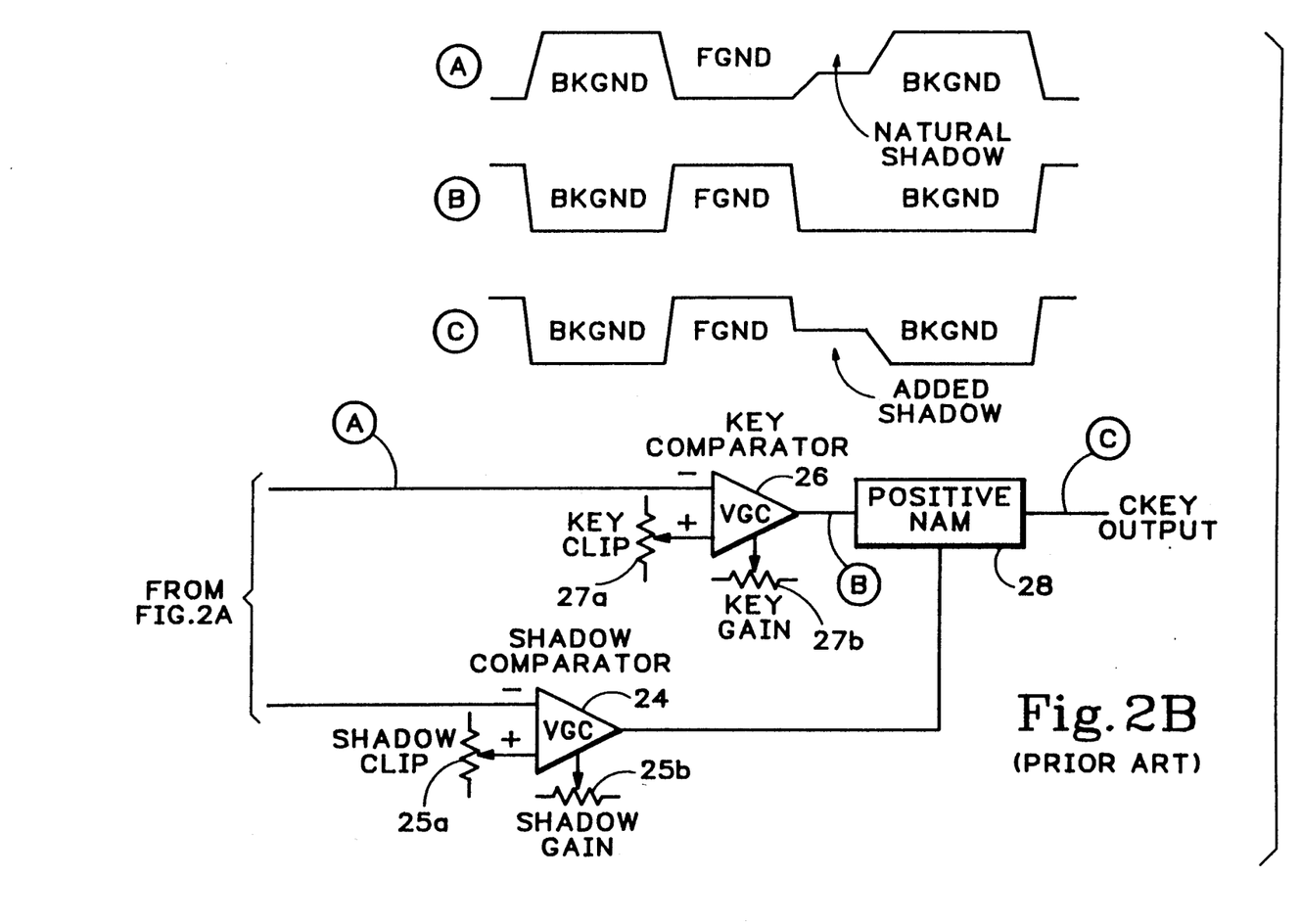

FIGS. 2A and 2B are a block diagram of a conventional (prior art) chroma keying circuit suitable for use with composite video signals. A matrix 2 receives RGB (red, green and blue) color component inputs and from them produces two color difference signals, $C_R$ and $C_B$, and a luminance signal Y. Alternatively, if color difference signals and a luminance signal are already available, the matrix could be replaced by scaling circuits to ensure that those signals were of the expected input amplitude.

The color difference signals, $C_R$ and $C_B$, are applied to two inputs of a hue correlation circuit 4. Taken together these two color difference $C_R$ and $C_B$ define a hue angle Θ, since the hue of an image represented by a video signal can be expressed in terms of the angle Θ whose tangent is equal to the ratio of the color difference components:

$$\Theta = \arctan(C_R/C_B) \qquad (2)$$

Other inputs to the hue correlation circuit 4 define a reference hue $a$, via sin $a$ and cos $a$ settings of ganged potentiometers 3$a$ and 3$b$, respectively. Ideally, the compositing screen is uniform in hue and the reference hue $a$ is precisely equal to the hue of the compositing screen Θ. However, to accommodate the minor variations in hue that tend to occur in the real world, the selectivity control 5 defines a range 2 delta$a$ of hues that is sufficient to encompass the normal variations in hue.

The image hue Θ is compared with the reference hue $a$ in hue correlation circuit 4. If the color difference components received by the hue correlation circuit 4 define a hue that is within the range $a \pm$ delta$a$ established by the reference hue and selectivity control, the hue correlation circuit 4 provides a positive output; otherwise it provides a negative output. The output of the hue correlation circuit 4, $HCC_{out}$, is:

$$HCC_{out} = C_{mag} \cdot \cos(\Theta - a) - C_{mag} \cdot SEL \cdot |\sin(\Theta - a)| \qquad (3)$$

where $C_{mag}$ is the chrominance magnitude and

SEL is a function of delta$a$.

Equation (3) has a positive value when the input hue is close to the reference hue, within the selectivity value, SEL. Positive NAM (non-additive mixer) 6 has the output of the hue correlation circuit 4, $HCC_{out}$, as one input, and a "0" as its other input. The positive NAM 6 functions to remove all negative values, thereby limiting the signal to non-negative values. The negative values correspond to foreground signals, while the non-negative values correspond to the range of expected background hues.

Although the background hue is chosen to avoid colors in the foreground, it nonetheless sometimes occurs that the foreground signal also contains hues that are within the range of reference background hues. This can occur, for instance, when the background hue is blue and a person in the foreground has a blue tie or blue eyes. To eliminate the undesirable effects that this would create, a forced foreground mask generator 10 supplies a mask signal to mixer 8 that is normally high, but becomes zero in regions to be masked. The mask signal controls the output of mixer 8 according to equation (1), with Z=0, to force the mixer 8 output to zero in those regions where background should not be present.

Thus, the output of the mixer 8 is positive in those regions of the image that are in the background. The output of mixer 8 is used to control mixer 12, according to equation (1), again with Z=0, so that it produces its Y input as its output in those regions where the output of mixer 8 is high, i.e., background. The Y input to mixer 12 is the output of matte generator 14. The operator selects background suppression values that determine the output of the matte generator 14 by observing how well it cancels out the reference hue to produce a suitable background on the screen. The resulting shaped matte signal output of mixer 12 is subtracted by summation circuit 16 from a composite video signal that has been suitably delayed by delay element 18. The output of summation circuit 16 is constrained in the values that it may assume by limiter 20. When the matte generator 14 is properly set up, the output of limiter 20 is the foreground fill over black, or a "shaped fill" video output.

The shaped fill video output is ready to be mixed with a new background video signal according to a chroma key signal that, in effect, "cuts a hole" in the new background signal. The output of mixer 8 is a version of the final chroma key signal, but it is desirable to modify it further for shadow control. To provide operator control over the shadows that the foreground images cast on the new background, the old shadows are removed from the keying signal and a controlled shadow is added back in.

The luminance output, Y, of matrix 2 is suitably delayed by delay element 22 and applied to the input of variable gain shadow comparator (VGC) 24. The shadow clip input to the variable gain shadow comparator 24 from potentiometer 25a is adjusted to extract the shadow information from the delayed luminance signal. The shadow gain control is adjusted via potentiometer 25b to determine how much shadow is to be added back into the key control signal. The output of all VGCs is limited to the system's maximum control level.

The variable gain key comparator (VGC) 26 receives the output of mixer 8, which contains the natural shadow, as illustrated in waveform A. The clipping of the key signal is determined by the setting of key clip potentiometer 27a, while the key gain is determined by the setting of key gain potentiometer 27b. The output of variable gain key comparator 26 has shadow information eliminated, as shown in waveform B. The output of the variable gain key comparator 26 is applied to one input of positive NAM 28, while the output of variable gain shadow comparator 24 is applied to the other. The positive NAM 28 combines these inputs into the key control signal shown in waveform C, a key signal with adjustable gain and adjustable shadow control.

Figure 3A:
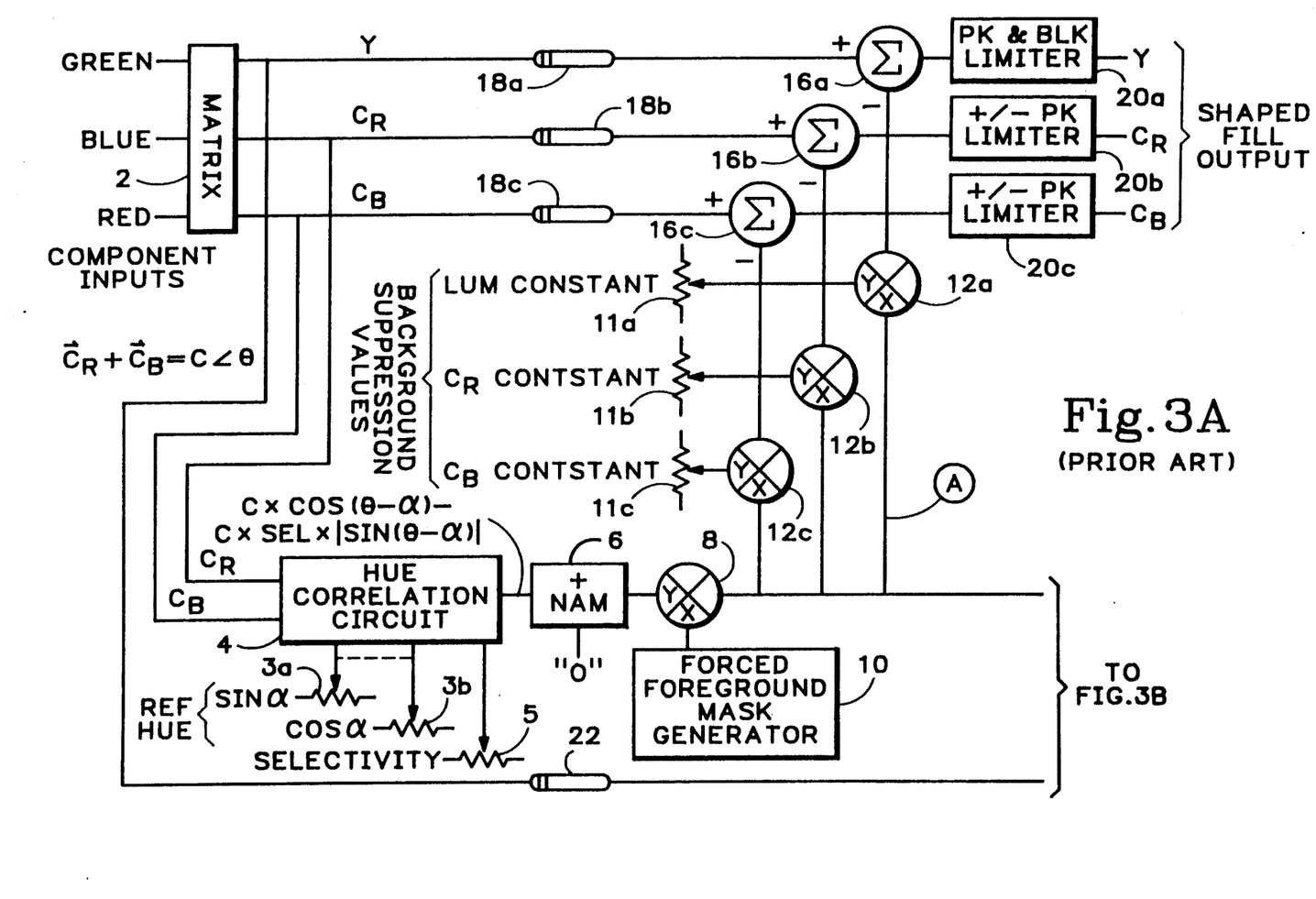
FIGS. 3A and 3B are a block diagram of a conventional chroma key generation circuit suitable for operating on component video.
Figure 3B:
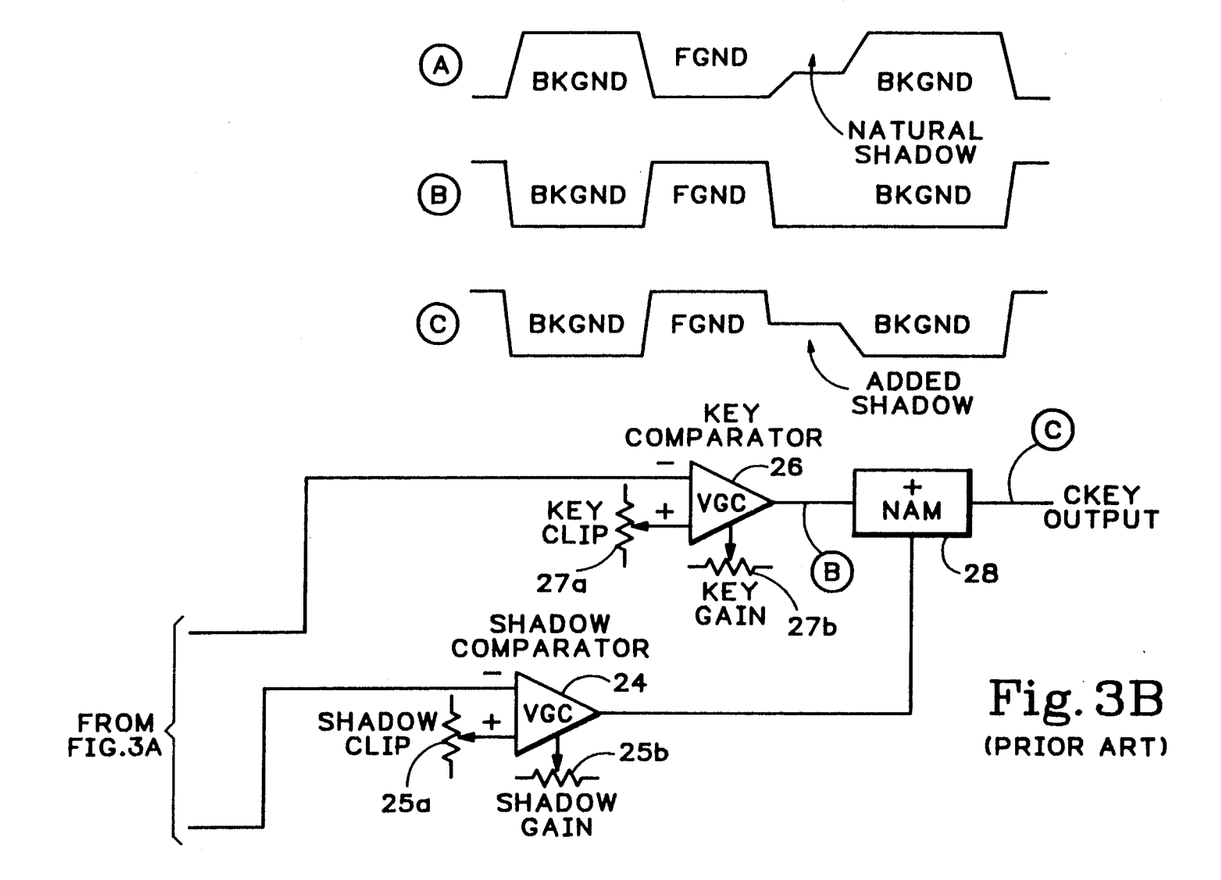

FIGS. 3A and 3B are a block diagram of a conventional (prior art) chroma keying circuit that performs the same function as the circuit shown in FIG. 2, except that it is suitable for use with component video signals. RGB color component inputs are converted by matrix 2 into two color difference signals, $C_R$ and $C_B$, and a luminance signal, Y. As before, the two color difference signals are inputs to a hue correlation circuit 4 whose output is shown in equation (3). The positive NAM 6, forced foreground mask generator 10, mixer 8, variable gain key comparator 26, delay element 22, variable gain shadow comparator 24 and positive NAM 28 all operate in the same manner as has been previously described in connection with FIG. 2. Note that the content of waveforms A, B and C in FIGS. 3A and 3B are is the same as their content in FIGS. 2A and 2B.

The main difference between the keyer circuit shown in FIGS. 3A and 3B and that shown in FIGS. 2A and 2B is that in FIG. 3A mixers 12a, 12b and 12c have replaced matte generator 14 and mixer 12, and summation circuits 16a, 16b and 16c have replaced summation circuit 16, so that the luminance constant, determined by potentiometer 11a, and two color difference constants, determined by potentiometers 11b and 11c, are now individually mixed with a Z=0 input in mixers 12a, 12b and 12c under the control of the output of mixer 8. The outputs of mixers 12a, 12b and 12c are subtracted from the corresponding component signals by summation circuits 16a, 16b and 16c after those separate component signals have been appropriately delayed by delay elements 18a, 18b and 18c. Limiter 20 has been replaced by peak and black limiter 20a on the luminance channel and ± peak limiters 20b and 20c on the color difference channels. Despite these implementation differences that are required by the separate component signals, the functional effect is identical and the three component outputs are again a "shaped fill" output.

The chroma key apparatuses shown in FIGS. 2A, 2B and 3A, 3B have ten operator controls. It is not easy for the operator to adjust these ten controls to produce a satisfactory instrument set-up, particularly because adjustments are made subjectively while observing the result on a monitor and because the controls are not independent of one another. The operator of a chroma key apparatus must therefore develop skill and understanding of how the chroma key apparatus works, and even then it can still take considerable time to achieve a satisfactory setup.

U.S. Pat. No. 4,413,273 to Wischermann for "System for Mixing Two Color Television Signals" discloses a method for generating key control signals utilizing the luminance and color of the foreground image at a reference point selected by the operator. U.S. Pat. No. 4,667,221 to Cawley et al for a "Video Editing System with Allowable Range for Key Signal Set By Detecting the Range in a Selected Area" discloses a system in which a range of key colors is determined by the extremes of color that are present in an area defined by the operator.

SUMMARY OF THE INVENTION

It is an object of the present invention to provide a chroma key generation circuit that is more fully automated than those of the prior art, and which therefore requires much less manual setup and adjustment time.

In accordance with the invention, a method and apparatus are provided for chroma key generation. An operator selects a reference portion of a color television image to identify it as the background of the image. A strobe signal is then generated whenever the video data that is presently passing through the keyer is within the reference portion of the color video image, and this strobe causes the video data corresponding to that portion of the image to be stored. A microprocessor then determines attributes of the video in the reference portion of the color image from the stored video data, these attributes including a reference hue, $\alpha$. As the video data over the whole image passes through the chroma key generator, the image hue $\Theta$ at each pixel in the image is correlated with the reference hue $\alpha$ to produce a correlation signal that has a first range of values for points of the color image at which the image hue matches the reference hue and a second range of values for points of the color image at which the image hue does not match the reference hue. After further processing this correlation signal becomes a chroma key signal. The attributes of the video in the reference portion of the image are employed via the microprocessor to process the video signal and associated chroma key signal in several ways, including background suppression matte generation, shadow clip level input to the shadow comparison circuitry, and the gain of the key signal variable gain comparator. Both composite and component versions of the method and apparatus are provided.

In the following description and in the ensuing claims, reference to an image hue matching a reference hue is not intended to imply that the image hue is precisely equal to the reference hue, but is intended to cover the possibility of the image hue differing from the reference hue by a selected degree of tolerance.

BRIEF DESCRIPTION OF THE DRAWINGS

For a better understanding of the invention, and to show how the same may be carried into effect, further reference will be made, by way of example, to the accompanying drawings in which.

DETAILED DESCRIPTION

Figure 4A:
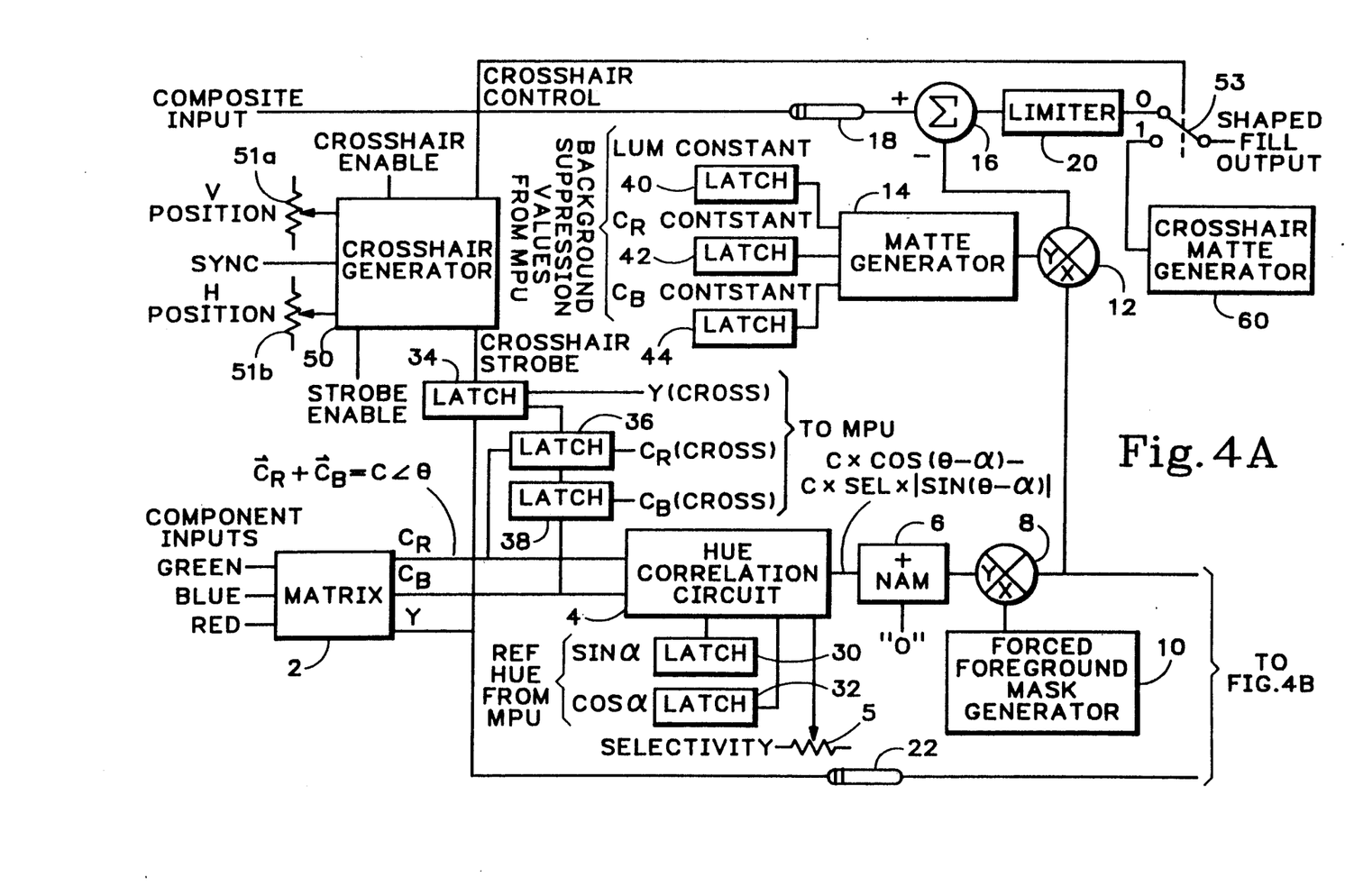
FIGS. 4A and 4B are a block diagram of a chroma key generation circuit for composite video according to the present invention.
Figure 4B:
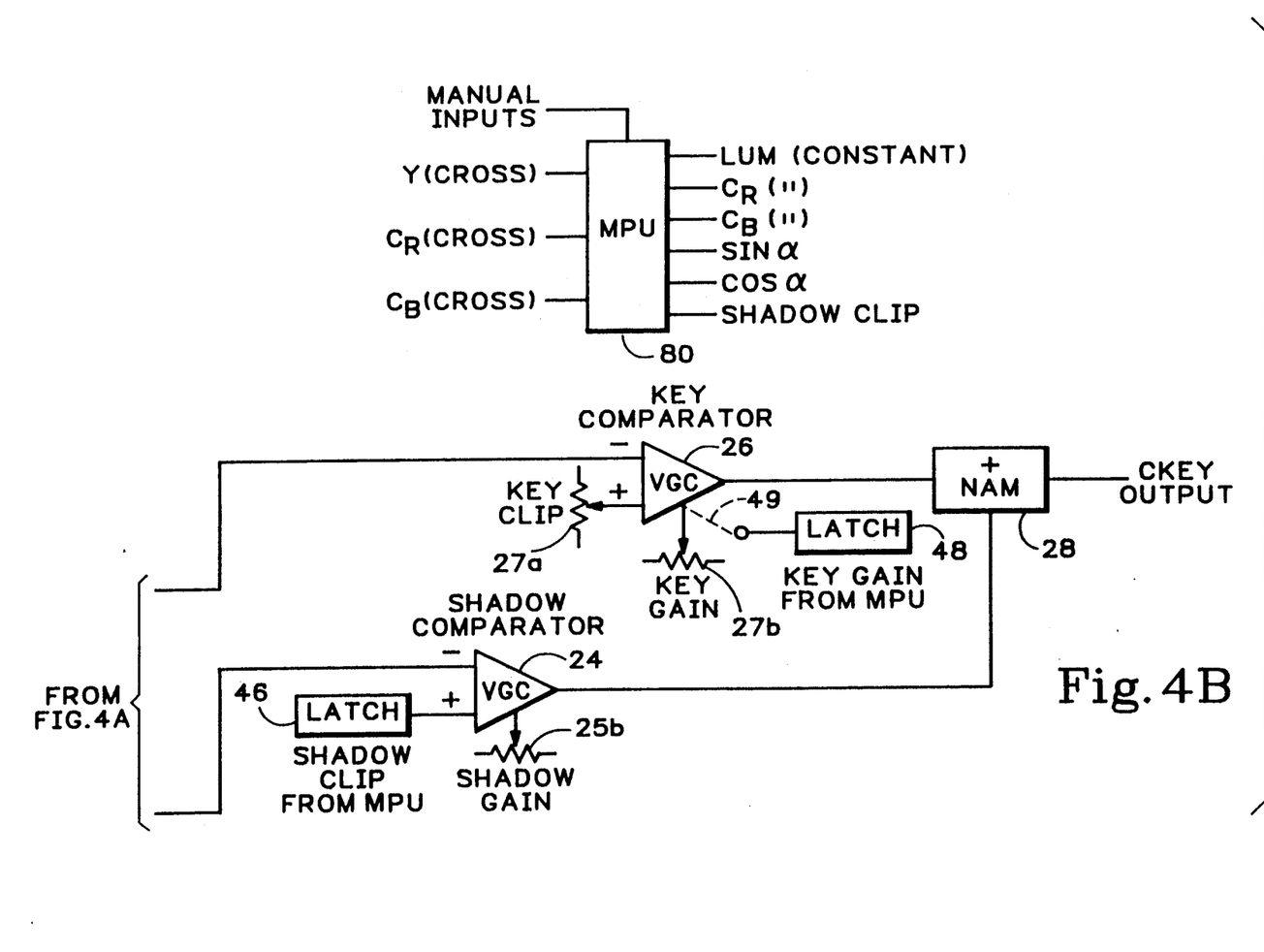

FIGS. 4A and 4B are a block diagram of a chroma key generation circuit for composite video signals according to the present invention. The chroma key generation circuit shown in FIGS. 4A and 4B is similar to the one shown in FIGS. 2A and 2B above, with the following exceptions: crosshair generator 50, switches 49 and 53, latches 34, 36, 38 and 48 and MPU 80 have been added, and potentiometers $3a$, $3b$, $11a$, $11b$, $11c$ and $25a$ have been replaced with latches 30, 32, 40, 42, 44 and 46, respectively.

As in the prior art circuits, matrix 2 receives RGB (red, green, blue) component signals and from them produces two color difference signals $C_R$ and $C_B$ and a luminance signal Y. And again, alternatively, if color difference signals and a luminance signal are already available, the matrix 2 could be replaced by scaling circuits to ensure that those signals are of the desired input amplitude. The color difference signals, $C_R$ and $C_B$, are applied to two inputs of a hue correlation circuit 4. And as above, these two color difference signals $C_R$ and $C_B$ define the hue angle $\Theta$ that is defined by equation (2) above. Also as above, the luminance output, Y, is applied to delay element 22.

However, in this circuit, unlike the ones described above, all three of the outputs of matrix 2, the two color difference signals, $C_R$ and $C_B$, and the luminance signal, Y, are also latched by latches 36, 38 and 34, respectively, upon the occurrence of a "crosshair strobe". The contents of these latches 34, 36 and 38 are read out by MPU (microprocessor unit) 80.

The crosshair strobe is generated by crosshair generator 50. The crosshair generator 50 allows the operator to select a point in the video image that is bright and evenly lit, so that the color and luminance values for that point may be stored. The crosshair generator 50 receives a crosshair enable signal, a strobe enable signal and sync information, as well as horizontal position information from Hposition potentiometer $51a$ and vertical position information from Vposition potentiometer $51b$.

The crosshair enable signal is active high during those periods when the operator is positioning the crosshair. When the operator is done positioning the crosshair and presses a button to indicate that the crosshair is located where he wants it and that data should be collected, the MPU 80 causes the strobe enable signal to go active high for a period of time. During this time, the crosshair generator 50 produces a series of crosshair strobes that latch data into latches 34, 36 and 38. The MPU 80 reads that data out of latches 34, 36 and 38 as many times as it needs for temporal averaging to reduce the effects of noise that may be present and then causes the crosshair enable and crosshair strobe signals to go inactive low.

While the crosshair enable signal is high, the crosshair generator 50 produces a crosshair control signal that is used to control switch (or multiplexer) 53, to select between the shaped fill output from limiter 20 and the output of crosshair matte generator 60. The crosshair matte generator 60 generates a signal representing a color that contrasts with the color generated by the matte generator 14.

Figure 5:
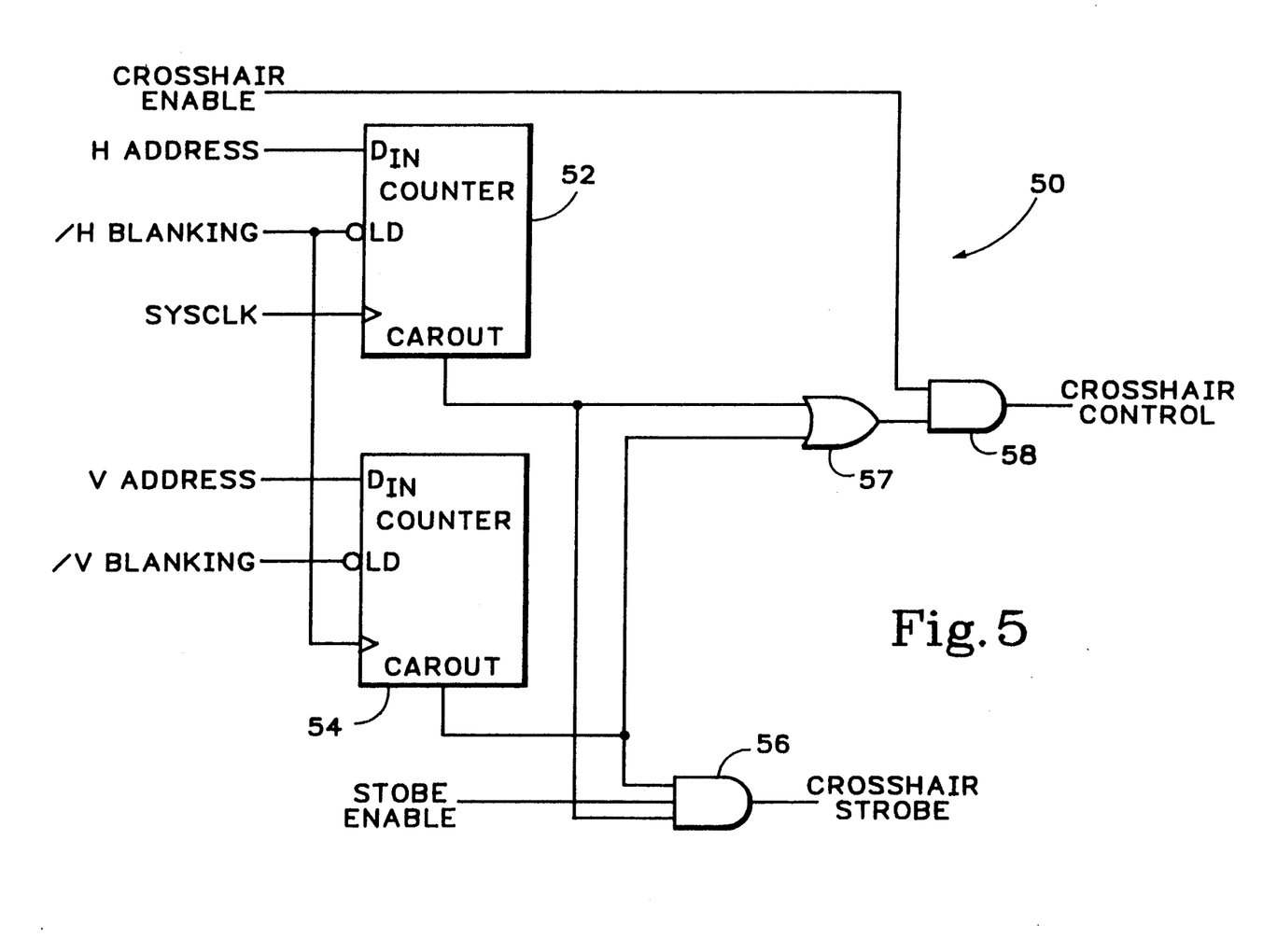
FIG. 5 is a schematic diagram of a simple crosshair generator that acquires video data values at a point.

Referring now to FIG. 5, a simple version of the crosshair generator 50 that acquires video data values at a single point consists of a horizontal address counter 52, a vertical address counter 54, an OR gate 57 and two AND gates 56 and 58. The horizontal address counter 52 is loaded during the horizontal blanking interval with the horizontal address at its data-in input, $D_{IN}$, which is determined by the setting of the Hposition potentiometer $51a$ (in FIG. 4). The signal/H BLANKING goes low during the horizontal blanking interval, thereby enabling the active-low load input (LD). During the active horizontal video interval, the horizontal address counter 52 counts down on system clocks (SYSCLK) until it produces a carry out signal (CAR OUT).

In a similar manner, the vertical address counter 54 is loaded during the vertical blanking interval with the vertical address at its data-in input, $D_{IN}$, which is determined by the setting of the Vposition potentiometer $51b$. The signal/V BLANKING goes low during the vertical blanking interval, thereby enabling the active-low load input (LD). During the active vertical video interval, the vertical address counter 54 counts down on /H BLANKING signals until it produces a carry out signal (CAR OUT).

OR gate 57 has the carry out signals from both counters 52 and 54 as its inputs and produces a high output whenever either counter 52 or 54 produces a high carry out signal. This occurs when the current screen address matches the operator selected location on the screen along one or the other axis. The high output of OR gate 57 will pass through AND gate 58 to produce an active-high crosshair control signal if the crosshair enable signal is high. As was noted in the foregoing partial discussion of FIG. 4, the crosshair control signal controls switch 53 to switch the output of the crosshair matte generator 60 into the output in lieu of the shaped fill output at the location of the crosshair.

When AND gate 56 is enabled by a high on the strobe enable input, it produces a high crosshair strobe output during the one pixel that represents the intersection of the horizontal and vertical crosshair addresses, i.e., when the carry out outputs of the horizontal address counter 52 and the vertical address counter 54 are both high at the same time. When the operator is satisfied that the location of the crosshair is satisfactory, he disables the further acquisition of the color difference and luminance values by operating controls that cause crosshair enable to go low, thereby disabling AND gate 58.

Figure 6A:
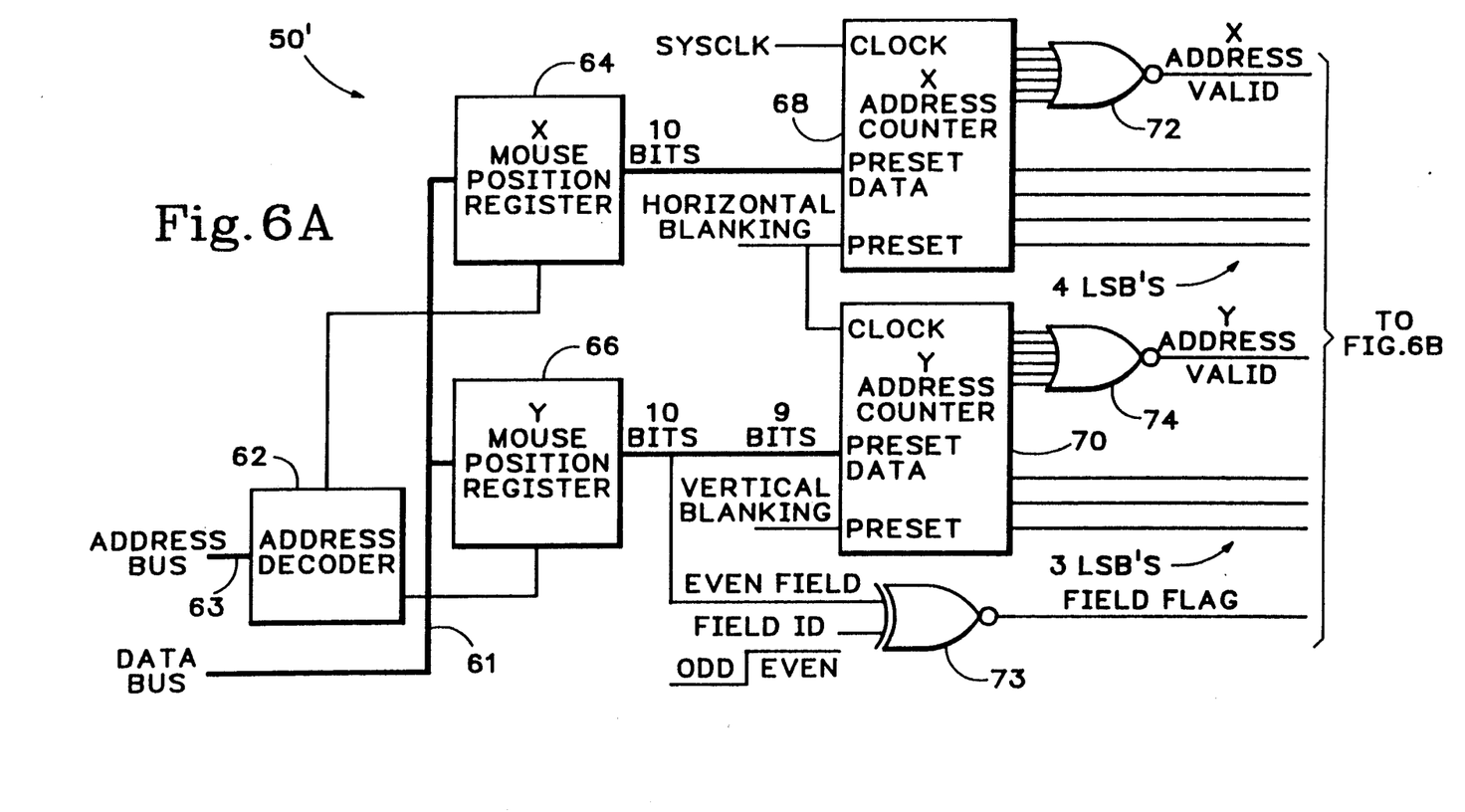
FIGS. 6A and 6B are a schematic diagram of a more complicated crosshair generator that is suitable for accumulating video data values over a 16×16 area of the image.
Figure 6B:
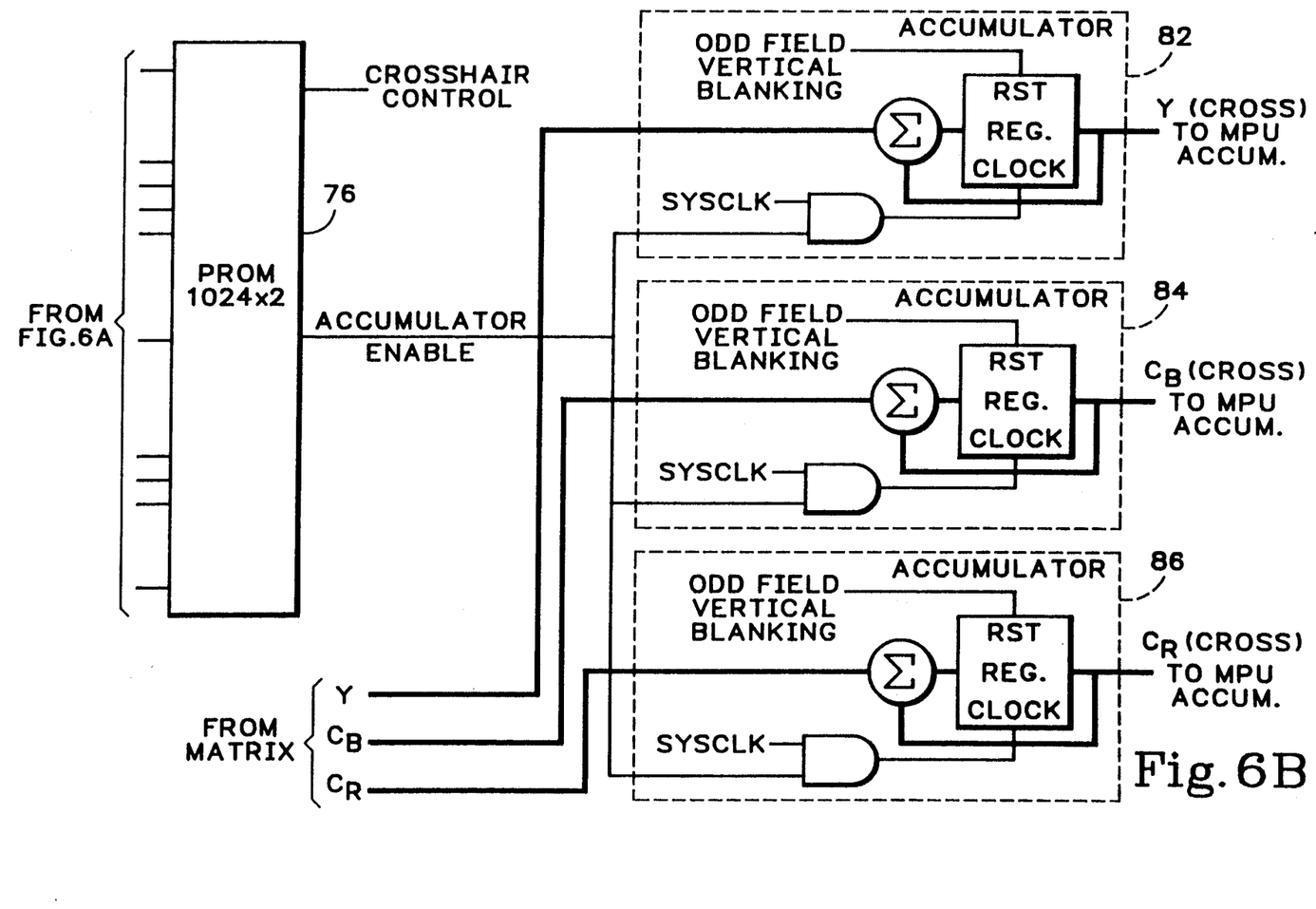

Referring now to FIGS. 6A and 6B a more complicated version of the crosshair generator 50 (which is labeled 50' to signify its differences) accumulates video data values over a 16×16 area of the image. This version of the crosshair generator 50' includes an address decoder 62, an X mouse position register 64, a Y mouse position register 66, X address counter 68, Y address counter 70, OR gate 72, OR gate 74, XNOR (exclusive-NOR) gate 73 and PROM 76. It supplies an accumulator enable signal to Y accumulator 82, $C_B$ (cross) accumulator 84 and $C_R$ (cross) accumulator 86, which then supply the inputs to latches 34, 36 and 38, shown in FIGS. 4A and 7A.

The MPU 80 sends X and Y mouse position data to the X mouse position register 64 and the Y mouse position register 66 by placing them sequentially on the data bus 61 and, while they are there, sending the addresses in the MPU's I/O map that are associated with the X and Y mouse position registers to the address decoder 62 via the address bus 63. The address decoder 62 identifies the addresses associated with the X mouse position register 64 and the Y mouse position register 66 and produces signals to cause them to clock in their respective inputs when their respective addresses are present on the address bus 63.

The X address counter 68 is loaded with the contents of the X mouse position register by the horizontal blanking signal. Similarly, the Y address counter 70 is loaded with the contents of the Y mouse position register by the vertical blanking signal. Both of these values are the complements of the actual pixel and line numbers associated with a particular identified location within the video image.

The X and Y address counters 68 and 70 count up from the values that they are loaded with, so that they reach an all zeros condition at the identified location. The X address counter 68 is a 10-bit counter that is clocked by system clocks and counts pixel addresses along each line. And, in an interlaced system, Y address counter 70 is a 9-bit counter that is clocked by the horizontal blanking signal and counts lines within each field.

OR gate 72 detects the all zeros condition of the X address counter 68 and produces an X address valid signal when it occurs. Because OR gate 72 does not monitor the least significant four bits of the output of the X address counter 68, the X address valid signal continues to be active for 16 clock pulses, representing 16 consecutive pixels, starting at the identified location. OR gate 74 detects the all zeros condition of the Y address counter 70 and produces a Y address valid signal when it occurs. Because OR gate 74 does not monitor the least significant three bits of the output of the Y address counter 70, the Y address valid signal continues to be active for 8 lines, starting at the identified line. By identifying 8 lines in two consecutive fields of video, OR gate 74 is actually identifying 16 lines in the resulting frame of interlaced video.

With respect to the generation of its accumulator enable signal output, the PROM 76 functions as an AND gate monitoring only the X address valid and Y address valid signals. The ANDed combination of the X address valid signal and the Y address valid signal defines a square 16×16 area within the video image. (The MPU 80 constrains the permissible values of X and Y mouse addresses so that this square remains within the edges of the video image, thus avoiding the accumulation of non-valid video values from within the blanking intervals.) Thus, the accumulator enable signal is active during 256 pixels arranged in a square once per frame. During the times that the accumulator enable signal is active, the three accumulators 82, 84 and 86 accumulate the video values of luminance Y and the two color difference components $C_B$ and $C_4$, respectively.

Once per frame, the accumulated values of $Y(cross)_{accum}$, $C_B(cross)_{accum}$ and $C_R(cross)_{accum}$ are clocked into latches 34', 36' and 38' (not shown, but analogous to latches 34, 36 and 38 in FIGS. 4). The latches 34', 36' and 38' are latched by the odd field vertical blanking signal, which also resets the accumulators 82, 84 and 86. The MPU 80 reads the accumulated values out of these latches 34', 36' and 38' and divides them by 256 to obtain spatially averaged values for $Y(cross)$, $C_B(cross)$ and $C_4(cross)$. The MPU 80 can also time average these spatially averaged values to obtain spatially and temporally averaged values for $Y(cross)$, $C_B(cross)$ and $C_4(cross)$.

The PROM 76 allows the crosshair control signal to generate a cursor pattern of any shape within the 16×16 square over which the spatial averaging is to occur. To accomplish this, the PROM 76 needs to know which field, odd or even, the video is within at any particular time. One of the output lines from the Y mouse position register 66 is an even field signal that is supplied by the MPU 80. The even field signal is high for even fields and low for odd fields. XNOR gate 73 monitors the even field signal and compares it with a field ID signal that is one of the sync signals in interlaced video systems. The XNOR gate 73 produces an active high field flag output whenever the even field and field ID signals match, i.e., whenever the present Y (line) address is in the current field. The foregoing complexity is only required for interlaced systems; in non-interlaced systems the Y address counter 70 is one bit wider and XNOR gate 73 is not required.

To produce the crosshair control signal, the PROM 76 also needs to know the status of the least significant 4 bits of the X address counter 68 output and the least significant 3 bits of the Y address counter 70 that were ignored by the OR gates 72 and 74, respectively. With this additional information available to it, the PROM 76 can be programmed to generate a crosshair control signal that is true for any desired pattern within the 16×16 square. A square pattern that is one pixel and one line thick and that creates an outline around the 16×16 square is a suitable example of such a pattern.

Although the crosshair generator 50' shown in FIGS. 6A and 6B do not have explicit crosshair enable and strobe enable inputs like the crosshair generator 50 shown in FIGS. 4A and 5, the MPU 80 can manipulate the inputs and ignore the outputs of this circuitry to achieve equivalent results. To make the crosshair control signal output of the PROM 76 stay inactive low, the MPU 80 can provide mouse position address to the X and Y mouse position registers 64 and 66 that correspond to locations that are outside of the image in the horizontal blanking interval. (Alternatively, an actual crosshair enable signal could be ANDed with the crosshair control output of the PROM 76.) To achieve the same effect as that caused by making the strobe enable signal in FIG. 5 go inactive, i.e., stopping data collection, the MPU can simply ignore the data being accumulated by accumulators 82, 84 and 86.

Returning to FIGS. 4A and 4B, the high crosshair strobe signal latches the current value of the color difference signals $C_R$ and $C_B$, and the luminance signal Y, into latches 36, 38 and 34, respectively. Thus, these latches save the values of these signals as they were at the location of the crosshair and forward them to the MPU 80.

As will be further described below, the MPU 80 uses the video values at the crosshair location to calculate and supply a number of parameters that are used to process the shaped fill output and the chroma key signal. To cancel out noise fluctuations that occur over time at the crosshair location, the MPU 80 can average a number of values collected at that point to determine time-averaged values.

The MPU 80 uses the $C_A$(cross) and $C_B$(cross) values at the crosshair location to determine the hue $\Theta$ at that location using equation (2) and then defines the reference hue angle $\alpha$ for the whole image as that value:

$$\alpha = \Theta_{crosshair\ location} = \arctan \frac{C_R(cross)}{C_B(cross)} \quad (2.1)$$

The MPU 80 then calculates the sine and cosine of $\alpha$, and supplies those values to latches 30 and 32, respectively. MPU 80 also calculates a luminance constant (LUM) and $C_R$ and $C_B$ constants for matte generator 14 and supplies them to it via latches 40, 42 and 44, respectively. The constants $C_R$ and $C_B$ are calculated to produce a vector of unit magnitude at the angle of the reference hue $\alpha$.

The luminance constant (LUM) is calculated from the ratio of the luminance magnitude to the chrominance magnitude at the location of the crosshair. The chrominance magnitude is calculated by taking the square root of the sum of the squares of the color difference signals:

$$C_{mag} = \sqrt{[C_A^2(cross) + C_B^2(cross)]} \quad (4)$$

Then, the luminance constant (LUM) can be calculated:

$$LUM = Y(cross)/C_{mag} \quad (5)$$

The luminance constant (LUM) is used by the matte generator 14 to produce a composite output whose luminance value, when multiplied in mixer 12 by the output of mixer 8 (the chrominance value), will produce a composite signal having a luminance value equal to Y(cross).

The MPU 80 also supplies a shadow clip constant to the shadow clip input of the variable gain shadow comparator 24 via latch 46. In one embodiment, the value of this constant is simply the luminance value at the location of the crosshair. If the crosshair is properly placed, it is in the brightest, evenly lit part of the background. Alternatively, a small negative offset can be added to that value, so that noise in the bright part of the background is clipped. When this is done in conjunction with a slightly increased shadow gain, noise is clipped at both the top and bottom of the shadow signal.

With switch 49 in the position shown, the value connected to the key gain input of the variable gain key comparator 26 is determined by the setting of the key gain potentiometer 27b, as it was in FIG. 2B. When switch 49 is in its other position, a key gain value supplied by the MPU 80 via latch 48 is the value applied to the key gain input of the variable gain key comparator 26. Usually, when the shadow circuitry is being used, switch 49 will be in the position shown and the key gain will be set manually. However, when the shadow circuitry is not being used, i.e., when the shadow gain is set to zero and only natural shadow is present, the key gain can be automatically set appropriately for linear keying. To do this, the signal level at the input to the variable gain key comparator 26 must be scaled to the system's mixer control level and the gain constant that is supplied is the ratio of the "on" mixer control level to the chrominance level at the crosshair (which should be the maximum in the background):

$$\text{Key Gain Const.} = X_{on}/C_{max}(cross) \quad (6)$$

Alternatively, as noted above, a small offset can be added to this gain value in conjunction with a slight positive offset to the key clip value. When this is done, noise in the foreground associated with low chrominance objects is clipped, as are noise, smudges, wrinkles, highlights and other imperfections in the background.

Figure 7A:
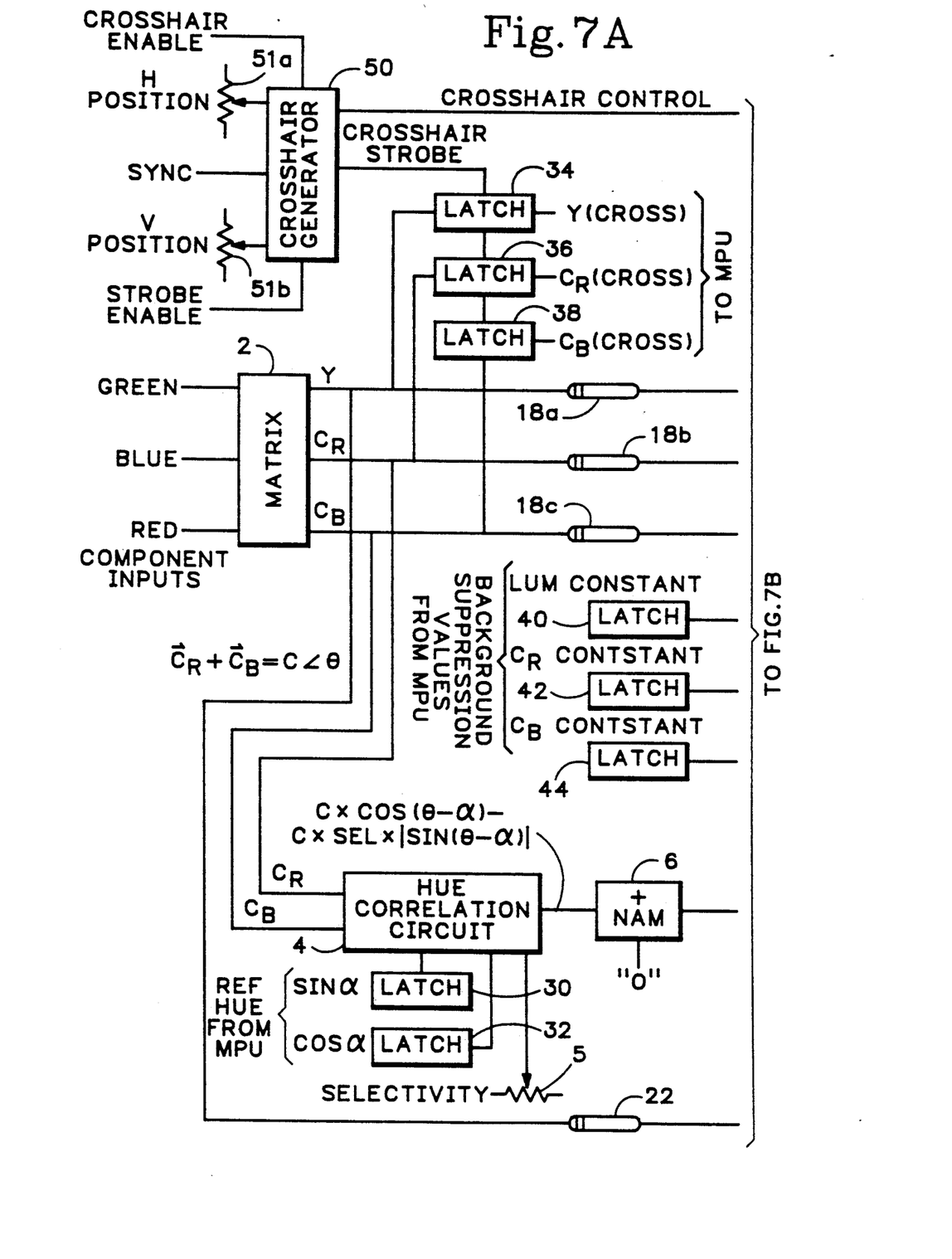
FIGS. 7A and 7B are a block diagram of a chroma key generation circuit for component video according to the present invention.
Figure 7B:
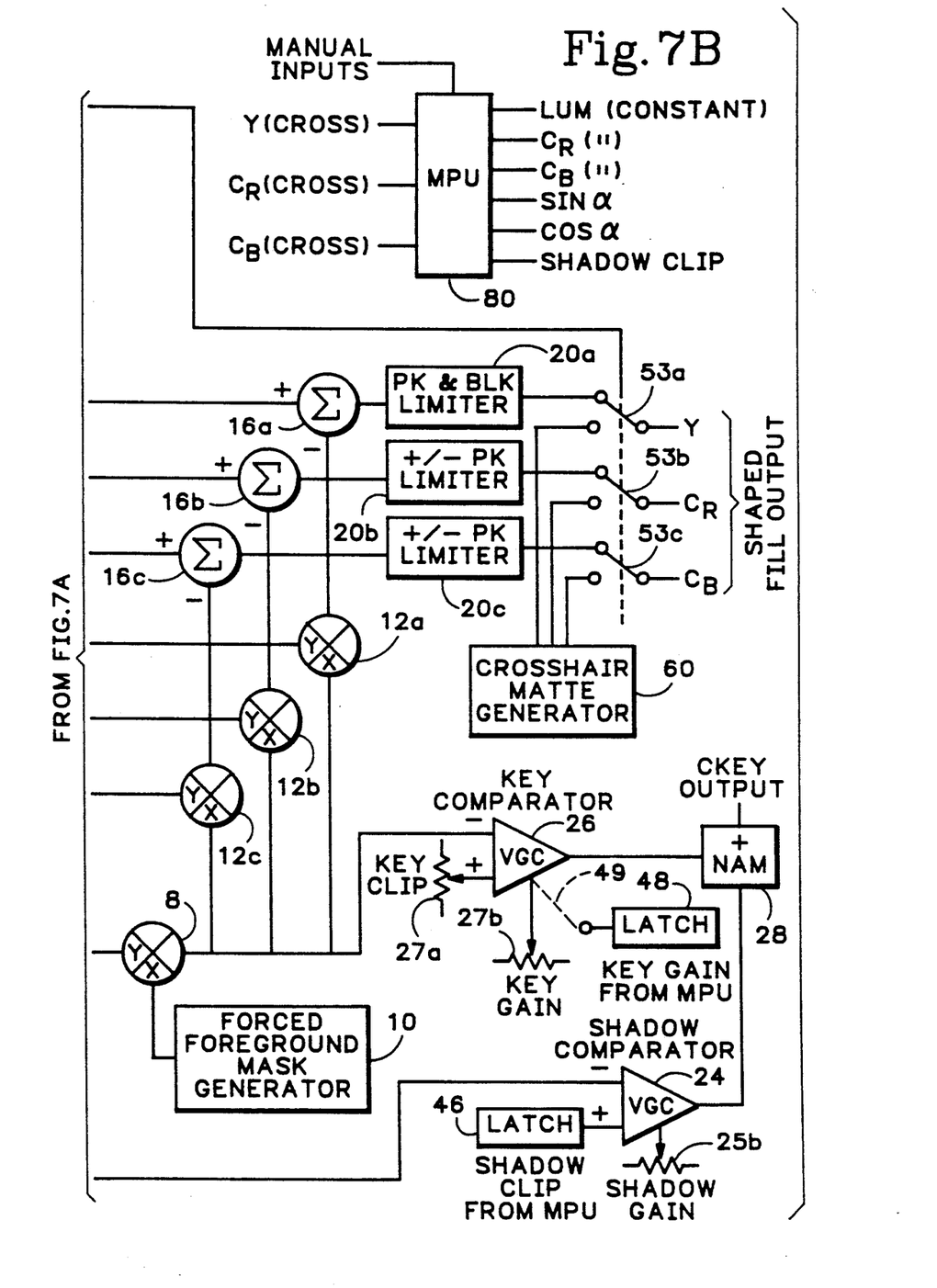

FIGS. 7A and 7B show a chroma key generation circuit that is like that shown in FIGS. 3A and 3B in that it is appropriate to a component video system, and yet has all of the same modifications as the chroma key generation circuit just described in connection with FIGS. 4A and 4B, i.e., crosshair generator 50, switches 49 and 53, latches 34, 36, 38 and 53a, 53b and 53c and MPU 80 have been added, and potentiometers 3a, 3b, 11a, 11b, 11c and 25a have been replaced with latches 30, 32, 40, 42, 44 and 46, respectively. For this circuit, the values of constants $C_R$ and $C_B$ supplied to latches 42 and 44 are $\sin(\alpha)$ and $\cos(\alpha)$, respectively.

This replacement of the potentiometers with latches, permits the MPU 80 to assist the operator by automatically setting up major portions of the chroma key generation circuit. Therefore, the chroma key generation circuits shown in FIGS. 4A, 4B and 7A, 7B provide the advantage of simplified operation. Specifically, operation is simplified by automating the setup of background color suppression matte generator 14 and of the variable gain shadow comparator 14, and, under some circumstance, the operation of the variable gain key comparator 26, as well as the automatic setting of the reference hue to the hue correlation circuit 4.

Even though the circuitry described above is capable of automating the chroma keyer setup, there are some circumstances in which an operator might wish to manually override part or all of the automatic setup. Therefore, in one embodiment, the MPU 80 (FIGS. 4A and 7B) also has available to it inputs from a variety of manual controls such as those shown in FIGS. 2A, 2B and 3A, 3B including those from reference hue angle potentiometers 3a,3b, selectivity control potentiometer 5, background suppression luminance constant potentiometer 11a, background suppression hue angle potentiometers 11b,11c, shadow clip level potentiometer 25a and key gain potentiometer 27b. With these manual values available to it, MPU 80 can respond to operator inputs by overriding its own automatic setup with the operator's adjustments.

It will be appreciated that the invention is not restricted to the particular embodiments that have been described and that variations may be made therein without departing from the scope of the invention as defined in the appended claims and equivalents thereof. For example, the invention is not limited to the color information at the reference point being stored in luminance and color difference component form, and in other implementations the information might be stored in primary color component (RGB) form or in hue, saturation and luminance form.

I claim:

1. A chroma key generation circuit comprising:
    location selection means for selecting a reference portion of a color image associated with a color video signal, the reference portion being of a plurality of adjacent pixels on a plurality of adjacent lines;
    means for storing the reference portion as video data representing the color video signal at the selected location;
    means for determining attributes of the reference portion of the color image from the stored video data, the attributes including a reference hue;
    hue comparison means for comparing an image hue, the image hue representing the hue of the color image as a function of position within the color image, with the reference hue and generating a correlation signal that has a first range of values for points of the color image at which the image hue matches the reference hue and a second range of values for points of the color image at which the image hue does not match the reference hue; and
    processing means for employing an attribute of the color image at the reference portion of the color image to process at least a component of the color video signal.

2. An apparatus according to claim 1, wherein the attributes determined by the means for determining are based on time-averaged values of the stored video data.

3. An apparatus according to claim 1, further comprising manual means for modifying the attributes.

4. An apparatus according to claim 1, wherein the processing means comprise shadow generation means.

5. An apparatus according to claim 4, wherein the shadow generation means comprises:
    means for storing a supplied luminance constant;
    means for subtracting the stored luminance constant from a luminance component to produce a shadow signal; and
    means for amplifying the shadow signal according to a shadow gain level.

6. An apparatus according to claim 1, wherein the processing means comprise means for clipping and amplifying a chroma key signal.

7. An apparatus according to claim 6, wherein the means for clipping and amplifying the chroma key signal comprises:
    means for subtracting a key clip level from the chroma key signal to produce a modified chroma key signal; and
    means for amplifying the modified chroma key signal according to a key gain factor based on an attribute of the color image at the reference portion of the color image.

8. An apparatus according to claim 1, wherein the processing means comprise background suppression means for producing a shaped composite fill video signal.

9. An apparatus according to claim 8, wherein the background suppression means comprises:
    means for supplying constants based on attributes of the color image at the reference portion of the color image;
    means for generating a matte signal from the supplied constants;
    means for producing a background suppression signal from the matte signal according to a chroma key signal; and
    means for subtracting the background suppression signal from a delayed composite video signal to produce a composite shaped fill video signal.

10. An apparatus according to claim 1, wherein the processing means comprise background suppression means for producing a shaped composite fill video signal.

11. An apparatus according to claim 10, wherein the background suppression means comprises:
    means for supplying constants based on attributes of the color image at the reference portion of the color image;
    means for producing component background suppression signals from the supplied constants according to a chroma key signal; and
    means for subtracting the component background suppression signals from delayed component video signals to produce component shaped fill video signals.

12. An apparatus according to claim 1, further comprising:
    means for limiting the correlation signal to the first range of values; and
    means for masking the limited correlation signal in areas of a foreground to produce a chroma key signal.

13. A method for chroma key generation comprising the steps of:
    selecting a reference portion of a color image associated with a color video signal, the reference portion being a plurality of adjacent pixels on a plurality of adjacent lines;
    storing video data of the color video signal when the reference portion is present;
    determining attributes of the reference portion of the color image from the stored video data, the attributes including a reference hue;
    comparing an image hue, the image hue representing the hue of the color image as a function of position within the color image, with the reference hue and generating a correlation signal that has a first range of values for points of the color image at which the image hue matches the reference hue and a second range of values for points of the color image at which the image hue does not match the reference hue; and
    employing an attribute of the color image at the reference portion of the color image to process at least a component of the color video signal.

14. A method according to claim 13, further comprising the step of modifying the attributes according to manual inputs.

15. A method according to claim 13, wherein the attributes determined in the determining step are based on time-averaged values of the stored video data.

16. A method according to claim 13, wherein the processing step comprises the step of generating a shadow signal.

17. A method according to claim 16, wherein the shadow generation step comprises the steps of:
storing a supplied luminance constant;
subtracting the stored luminance constant from a luminance component to produce a shadow signal; and
amplifying the shadow signal according to a shadow gain level.

18. A method according to claim 13, wherein the processing step comprises the step of clipping and amplifying a chroma key signal.

19. A method according to claim 19, wherein the step of clipping and amplifying the chroma key signal comprises the steps of:
subtracting a key clip level from the chroma key signal to produce a modified chroma key signal; and
amplifying the modified chroma key signal according to a key gain factor based on an attribute of the color image at the reference portion of the color image.

20. A method according to claim 13 wherein the processing step comprises the step of suppressing a background to produce a shaped composite fill video signal.

21. A method according to claim 20, wherein the step of suppressing the background comprises the steps of:
supplying constants based on attributes of the color image at the reference portion of the color image;
generating a matte signal from the supplied constants;
producing a background suppression signal from the matte signal according to a chroma key signal; and
subtracting the background suppression signal from a delayed composite video signal to produce a composite shaped fill video signal.

22. A method according to claim 13, wherein the processing step comprises the step of suppressing a background to produce a shaped component fill video signal.

23. A method according to claim 23, wherein the suppressing the background step comprises the steps of:
supplying constants based on attributes of the color image at the reference portion of the color image;
producing component background suppression signals from the supplied constants according to a chroma key signal; and
subtracting the component background suppression signals from a delayed component video signal to produce component shaped fill video signals.

24. A method according to claim 13 further comprising the steps of:
limiting the correlation signal to the first range of values; and
masking the limited correlation signal in areas of a foreground to produce a chroma key signal.

* * * * *